United States Patent
Aalipour Hafshejani et al.

(10) Patent No.: US 11,650,980 B2
(45) Date of Patent: May 16, 2023

(54) METHODS AND APPARATUS FOR RETRIEVING INFORMATION VIA AN INTERMEDIATE REPRESENTATION

(71) Applicant: Walmart Apollo, LLC, Bentonville, AR (US)

(72) Inventors: Ghodratollah Aalipour Hafshejani, San Jose, CA (US); Arpit Sharma, Santa Clara, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 142 days.

(21) Appl. No.: 17/163,141

(22) Filed: Jan. 29, 2021

(65) Prior Publication Data
US 2022/0245134 A1    Aug. 4, 2022

(51) Int. Cl.
*G06F 16/242* (2019.01)
*G06F 16/2452* (2019.01)
*G06F 40/295* (2020.01)
*G06F 40/30* (2020.01)
*G06Q 30/0601* (2023.01)

(52) U.S. Cl.
CPC ...... *G06F 16/243* (2019.01); *G06F 16/24522* (2019.01); *G06F 40/295* (2020.01); *G06F 40/30* (2020.01); *G06Q 30/0627* (2013.01)

(58) Field of Classification Search
CPC ............. G06F 16/243; G06F 16/24522; G06F 40/295; G06F 40/30; G06Q 30/0627
See application file for complete search history.

(56) References Cited

U.S. PATENT DOCUMENTS

| | | | |
|---|---|---|---|
| 6,615,172 | B1 | 9/2003 | Bennett et al. |
| 7,873,654 | B2 | 1/2011 | Bernard |
| 9,547,647 | B2 | 1/2017 | Badaskar |
| 10,580,412 | B2 | 3/2020 | Kothari et al. |
| 2018/0052913 | A1 | 2/2018 | Gaskill et al. |
| 2018/0144385 | A1* | 5/2018 | Subramanya ...... G06Q 30/0621 |
| 2018/0268818 | A1 | 9/2018 | Schoenmackers et al. |
| 2021/0124564 | A1* | 4/2021 | Giltner ................. G06F 9/46 |
| 2022/0050840 | A1* | 2/2022 | Parravicini ........... G06F 16/248 |

FOREIGN PATENT DOCUMENTS

CN          110781280          2/2020

OTHER PUBLICATIONS

Hains, From natural language to graph queries, 2019, IEEE, whole document (Year: 2019).*

* cited by examiner

*Primary Examiner* — Sonia L Gay
(74) *Attorney, Agent, or Firm* — Morgan, Lewis & Bockius LLP; Manita Rawat

(57) ABSTRACT

The disclosed subject matter relates to a system and method for providing an automated assistant that retrieves information from a knowledge base in response to a user's natural language question. A user's natural language question voice is transformed into an intermediate representation. From the intermediate representation, a cypher query is generated which may be used to query the database. The query results are provided in response to the user. The transformation into the intermediate representation is database independent while the cypher query is dependent upon the database queried.

20 Claims, 5 Drawing Sheets

METHODS AND APPARATUS FOR RETRIEVING INFORMATION VIA AN INTERMEDIATE REPRESENTATION

TECHNICAL FIELD

The disclosed subject matter relates generally to automated assistants for answering user questions. The automatic assistants utilizing an intermediate representation of the question to more effectively retrieve information from a knowledge base.

BACKGROUND

In recent years, with the development of cognitive intelligence technology, the success rate of speech recognition has been greatly improved, and applications based on speech recognition as well as natural language processing have also been comprehensively promoted. In addition to basic applications such as voice input, voice-based and text-based human-computer interaction applications such as voice and online assistants (i.e. automated assistants) have gradually become the standard configuration of intelligent systems. Among them, the question-and-answer interaction of automated assistants can greatly reduce the workload of manual customer service, and increase the user's experience, but at the same time, it also has higher requirements for the cognitive ability, knowledge search and knowledge matching capabilities of intelligent systems.

In the prior art, the voice assistant is usually used in conjunction with the knowledge base. The front end first recognizes the user's voice input, converts the voice information into text information, and then queries in the knowledge base, and then matches the query with the voice content. Typically, as compared with text interaction, voice interaction is more random and not conducive to query generation even when the database includes the information needed. For conventional knowledge bases, it is often difficult to give accurate answers due to lack of effective query generation.

Moreover, given the expanding number of database types and thus query formats, the training required for the direct generation of queries would be substantial and multiplied for each type of database. Thus there is a need for an intermediate representation to allow for the transformation of natural language questions, such that a database query may be generated with deterministic effect irrespective of the database type, and without the overhead of extensive training.

SUMMARY

The embodiments described herein are directed to a system and method for retrieving information from a knowledge base in response to a user's natural language question, specifically to an online shopping assistant. In addition to or instead of the advantages presented herein, persons of ordinary skill in the art would recognize and appreciate other advantages as well.

In accordance with various embodiments, exemplary systems may be implemented in any suitable hardware or hardware and software, such as in any suitable computing device.

In some embodiments, a system for retrieving information from a knowledge base in response to a user's natural language question includes a communication system, a database; and, a question answering computing device connected to the database and the communication system. The question answering computing device is configured to receive the user's natural language question from the communication system and transform the question into an intermediate representation. The question answering computer device generates/creates a cypher query from the intermediate representation and queries the database with the cypher query. The question answering computing device receives information from the database in response to its query; and, provides the information to the user over the communication system.

In some embodiments, a method is also provided that retrieves information from a knowledge base in response to a user's natural language question. The method includes receiving a user's natural language question voice or text over a communication system and transforming the question into an intermediate representation. From the intermediate representation the method creates a cypher query and queries the database with the cypher query. The method further includes receiving information from the database in response to the query and providing the received information to the user over the communication system.

In yet other embodiments, a non-transitory computer readable medium having instructions stored thereon is provided. The instructions, when executed by at least one processor, cause a device to perform operations comprising: receiving a user's natural language question over a communication system; transforming the user's natural language question into an intermediate representation, and creating a cypher query from the intermediate representation. The instructions further cause the device perform the operations of querying the database with the cypher query; receiving information from the database in response to the query; and, providing the information to the user over the communication system.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein.

DETAILED DESCRIPTION

Figure 1:
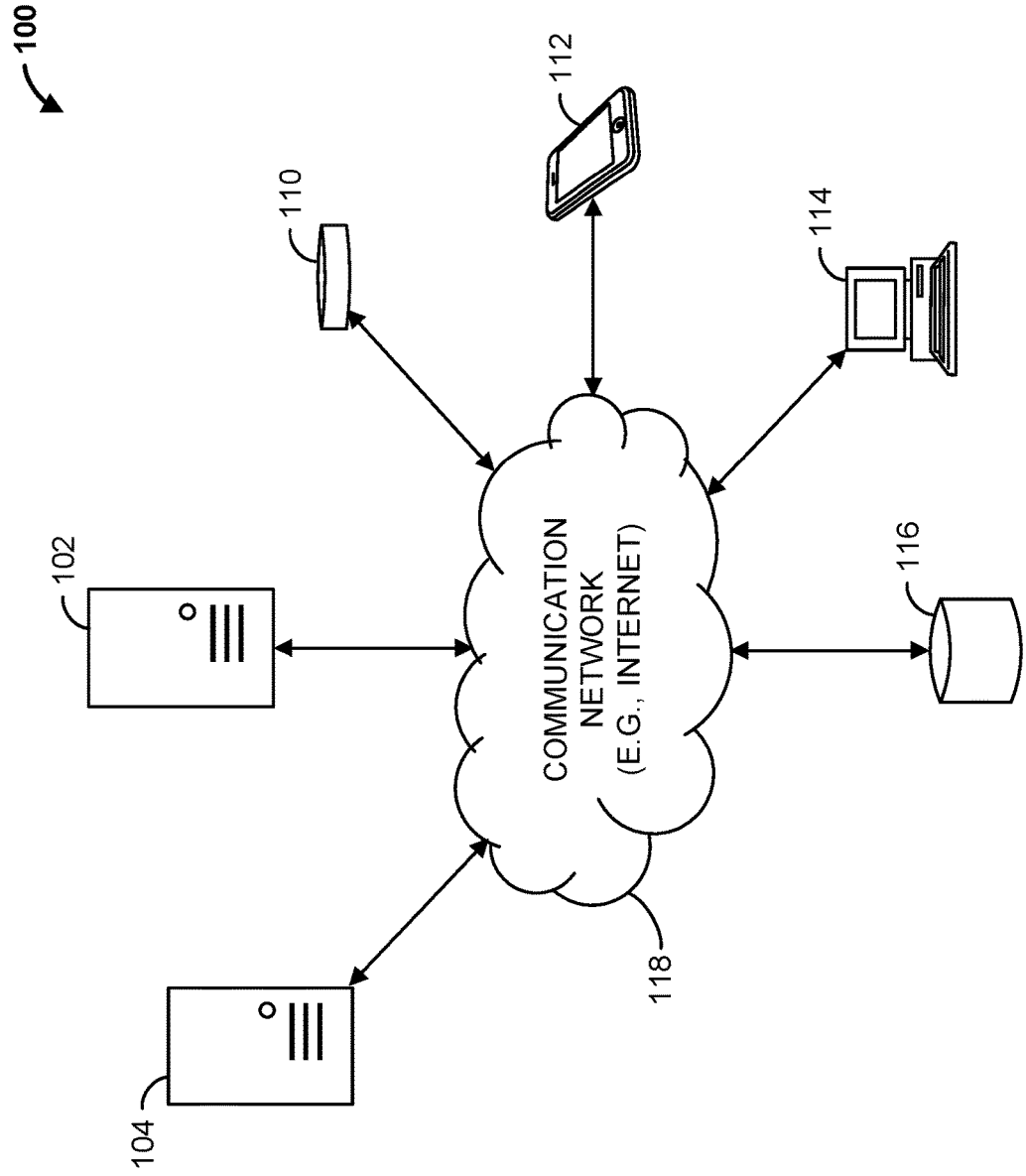
FIG. 1 is a block diagram of communication network used to answer questions from information contained in the knowledge base in accordance with some embodiments.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Turning to the drawings, FIG. 1 illustrates a block diagram of a communication system 100 that includes an question answering computing device 102 (e.g., a server, such as an application server), a web server 104, database 116, and multiple customer computing devices 110, 112, 114 operatively coupled over network 118.

A question answering computing device 102, server 104, and multiple customer computing devices 110, 112, 114 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit data to, and receive data from, or through the communication network 118.

In some examples, the question answering computing device 102 can be a computer, a workstation, a laptop, a server such as a cloud-based server, or any other suitable device. In some examples, each of multiple customer computing devices 110, 112, 114 can be a cellular phone, a smart phone, a tablet, a personal assistant device, a voice assistant device, a digital assistant, a laptop, a computer, or any other suitable device. In some examples, question answering computing device 102, and web server 104 are operated by a retailer, and multiple customer computing devices 112, 114 are operated by customers of the retailer.

Although FIG. 1 illustrates three customer computing devices 110, 112, 114, communication system 100 can include any number of customer computing devices 110, 112, 114. Similarly, the communication system 100 can include any number of workstation(s) (not shown), question answering computing devices 102, web servers 104, and databases 116 and 117.

The question answering computing device 102 is operable to communicate with database 116 over communication network 118. For example, question answering computing device 102 can store data to, and read data from, database 116. Database(s) 116 may be remote storage devices, such as a cloud-based server, a disk (e.g., a hard disk), a memory device on another application server, a networked computer, or any other suitable remote storage. Although shown remote to the question answering computing device 102, in some examples, database 116 may be a local storage device, such as a hard drive, a non-volatile memory, or a USB stick. The question answering computing device 102 may store data from workstations or the web server 104 in database 116. In some examples, storage devices store instructions that, when executed by question answering computing device 102, allow the question answering computing device 102 to determine one or more results in response to a user query.

Communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 118 can provide access to, for example, the Internet.

Figure 2:
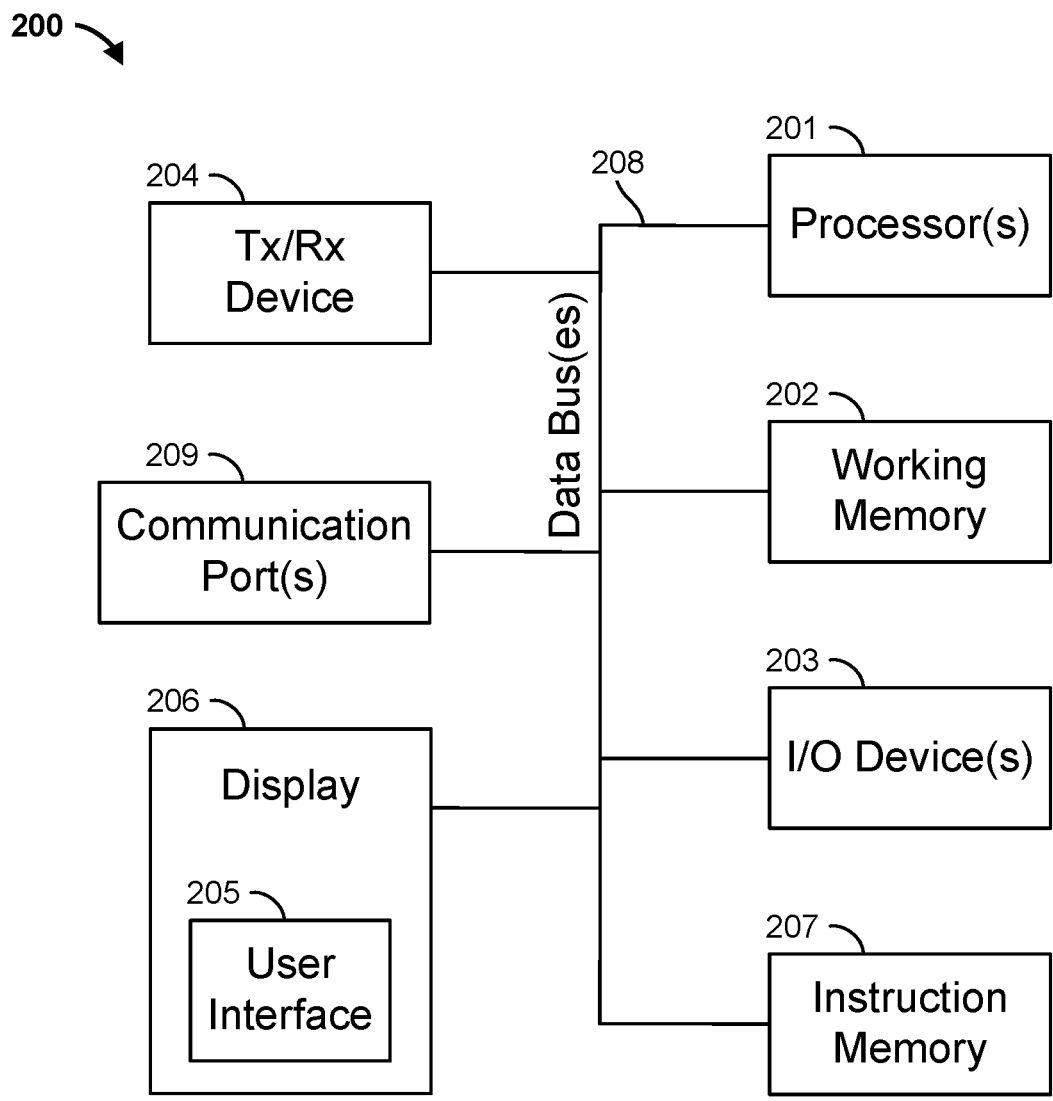
FIG. 2 is a block diagram of the question answering computing device of the communication system of FIG. 1 in accordance with some embodiments.

FIG. 2 illustrates the question answering computing device 102 of FIG. 1. The question answering computing device 102 may include one or more processors 201, working memory 202, one or more input/output devices 203, instruction memory 207, a transceiver 204, one or more communication ports 207, and a display 206, all operatively coupled to one or more data buses 208. Data buses 208 allow for communication among the various devices. Data buses 208 can include wired, or wireless, communication channels.

Processors 201 can include one or more distinct processors, each having one or more processing cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Processors 201 can be configured to perform a certain function or operation by executing code, stored on instruction memory 207, embodying the function or operation. For example, processors 201 can be configured to perform one or more of any function, method, or operation disclosed herein.

Instruction memory 207 can store instructions that can be accessed (e.g., read) and executed by processors 201. For example, instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of question answering computing device 102. Working memory 202 can be a random access memory (RAM) such as a static random access memory (SRAM) or dynamic random access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 209 can include, for example, a serial port such as a universal asynchronous receiver/transmitter (UART) connection, a Universal Serial Bus (USB) connection, or any other suitable communication port or connection. In some examples, communication port(s) 209 allows for the programming of executable instructions in instruction memory 207. In some examples, communication port(s) 209 allow for the transfer (e.g., uploading or downloading) of data, such as machine learning algorithm training data.

Display 206 can display user interface 205. User interfaces 205 can enable user interaction with question answering computing device 102. In some examples, a user can interact with user interface 205 by engaging input-output devices 203. In some examples, display 206 can be a touchscreen, where user interface 205 is displayed by the touchscreen.

Transceiver 204 allows for communication with a network, such as the communication network 118 of FIG. 1. For example, if communication network 118 of FIG. 1 is a cellular network, transceiver 204 is configured to allow communications with the cellular network. In some examples, transceiver 204 is selected based on the type of communication network 118 question answering computing device 102 will be operating in. Processor(s) 201 is operable to receive data from, or send data to, a network, such as communication network 118 of FIG. 1, via transceiver 204.

In disclosed embodiments, a graphical Knowledge Base (KB) of products within a retail catalog is created for use in an automated shopping assistant, specifically a voice shopping assistant. The question answering system leverages the existing knowledge base to answer factual questions about the products (items, services, topics etc.) in it. Typically user queries are directed to specific attributes of products. For example the query "How much fat does a serving of great value milk contain?" The answers to these types of questions are generally contained in the knowledge base as the products and their attributes. Although the information is present in the knowledge base, the information, as described herein is advantageously represented in an efficiently retrievable format. Furthermore, a question answering system advantageously transforms the user queries in natural language into cypher queries that can be executed on the database housing the knowledge base to retrieve the answers to the queries.

For example, many factual questions about grocery products are based on specific attributes of products, such as "How much fat does a serving of great value milk contain?" and "What brands of milk do you have?" These questions can be answered by using a knowledge base that contains all the products that are sold by the retailer, and the values of various attributes associated with those products.

Figure 3:
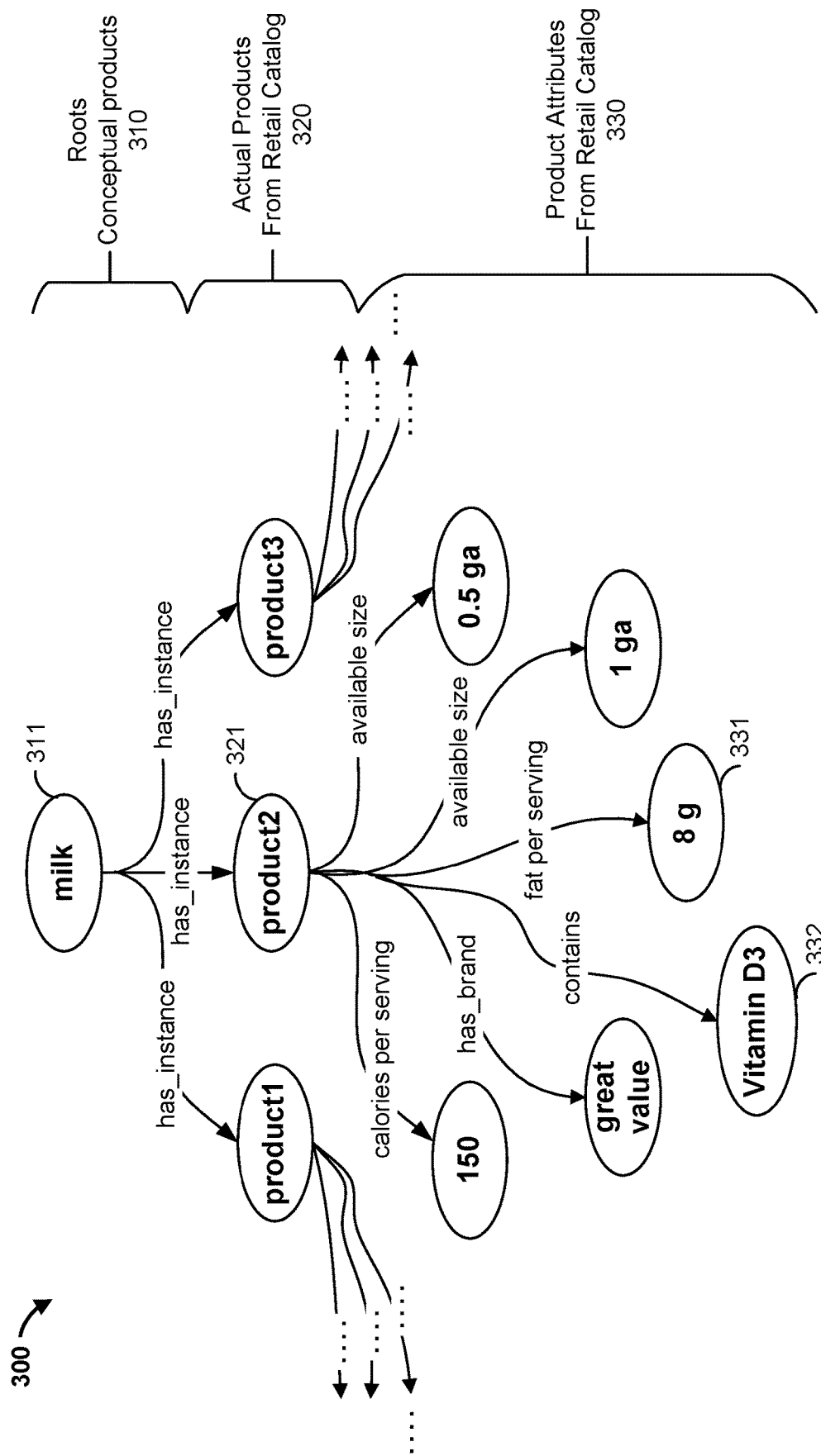
FIG. 3 is an illustration of a knowledge base containing information by which the users questions may be answered in accordance with embodiments of the disclosed subject matter.

A snapshot of the knowledge base 300 pertaining to "milk" that is helpful in answering the above mentioned question is shown in FIG. 3. The graphical knowledge base of grocery products allows for efficient retrieval. The nodes in the graphical knowledge base include of products and their attributes, where the directed edges represent the relationship between the nodes. As shown, the knowledge base nodes include Roots 310 or conceptual products, actual products 320 such as "Great Value whole Milk" along with attributes 330. The edges represent the relationships between the nodes, for example "Great Value whole Milk" 321 is an instance of "Milk" 311. The attributes of node "Great Value whole Milk" 321 include fat per serving of 8 grams as shown in node 331, and contains Vitamin D3 as shown in node 332. Other node relationships shown include calories per serving, brand, available sizes, etc. While the knowledge base is described with respect to groceries, it is equally applicable other products, services, topics, and general data.

Figure 4:
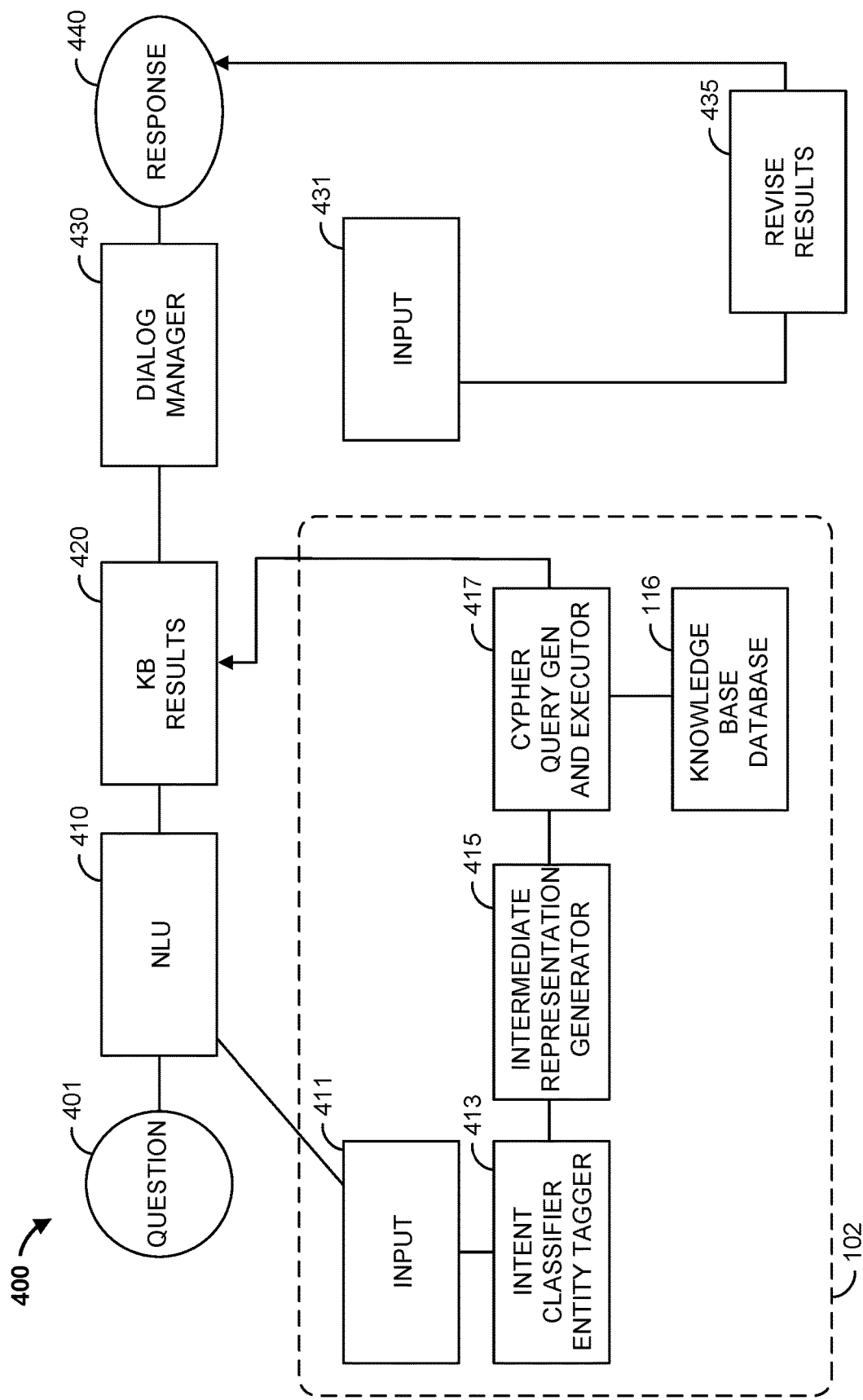
FIG. 4 is flow diagram of the question answering system in accordance with embodiments of the disclosed subject matter; and, FIG. 5 is a flowchart of a method for retrieving information from a knowledge base in response to a user's natural language question in accordance with embodiments of the disclosed subject matter.

FIG. 4 is a flow diagram 400 of an exemplary question answering system according to the disclosed subject matter. A question 401 is presented to the system, via the communication system 118, for example "What brands of milk do you have?" Natural language processing 410 is performed by question answering computing device 102. The processes undertaken by the question answering computing device 102 include receiving the question as input 411 and classifying the intent and tagging/identifying the entities of the question using a natural language process 413. For example the intent for question 401 is a brand search and the entities include the root "Milk." An intermediate representation generator 415 using the extracted intent and the entities transforms the question 401 into an intermediate representation.

The transformation into the intermediate representation utilizes a set of predicates defined based on the ways the knowledge base may be queried, the transformation provides an intermediate representation of PREDICATE(X, in, Y) which as shown is a ternary predicate where X is a property attribute of a product, and Y is a product. In the illustrative example X is "brand" and Y is "Milk" resulting in an intermediate representation of VALUEOFPROP (brand, in, milk). The intermediate representation may have multiple predicates, each predicate having its own set of input arguments. Other examples of predicates and their arguments include: A) Predicate=contains, number of arguments=2, such that CONTAINS(X,Y) where X is a product and Y is a nutrient (e.g., calcium) or an ingredient (e.g., sucrose) B) Predicate=valueOfProp, number of arguments=3, such that the second argument is always "in", for example VALUEOFPROP(X,in,Y) where X is a product and Y is a property/attribute of a product (e.g., brand, size and availability). Mapping rules are predefined to map the intents and entities into the predicate representations.

From the intermediate representation of question 401, a cypher query generator 417 of the question answering system generates a cypher query and executes the query of the database 116 to retrieve the relevant information from the knowledge base. The intermediate representation of PREDICATE(X, in, Y) is mapped using predefined templates/rules into the cypher query "SELECT X FROM KB WHERE root=Y. In the illustrative example, the cypher query for example may be "SELECT brand From KB WHERE root=Milk" for a pseudo-SQL query. The results from the knowledge base query 420, in this example the brands of milk "great value" and "horizon organic", are optionally provided to a dialog manager 430. The dialog manager 430, using the query results as an input 431, revises the knowledge base query results into a user friendly response as shown in Block 435 and is transmitted as a response 440 to the user. In the illustrative example the user friendly response transmitted to the user is "We have the following brands of milk: great value and horizon organic." The response 440 is preferably provided to the user in the same mode as the question, i.e. a voice response to a voice question and a text response to a text question.

Figure 5:
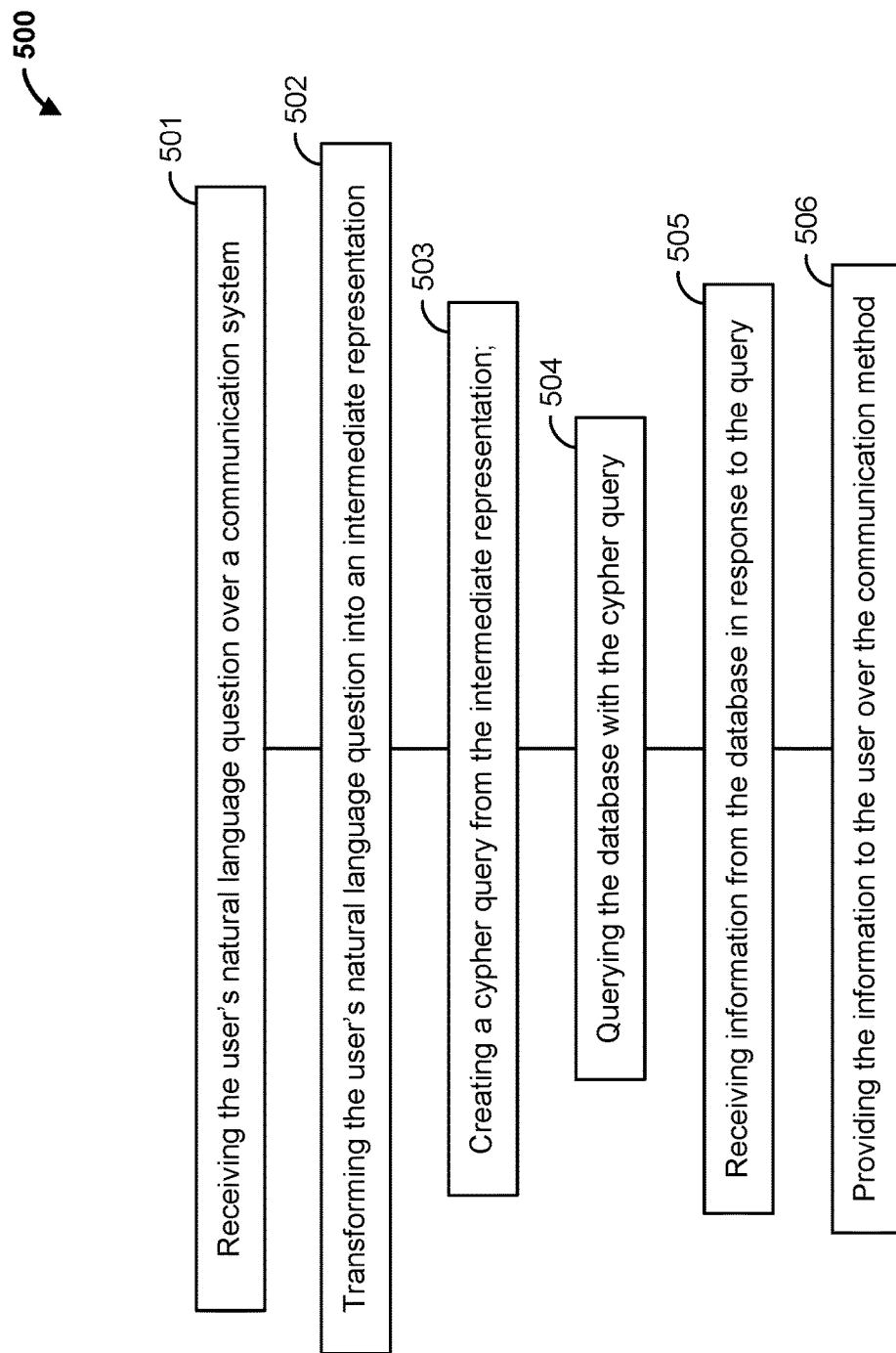

Turning to FIG. 5, is a method 500 for retrieving information from the knowledge base in order to answer a customer's (user's) question. As shown in Block 501, the question answering system receives the user's natural language question over the communication system. The user may present the question via voice or text for example to an automated shopping assistant. An illustrative example of a user's question is "Does great value milk contain Vitamin D3?"

In Block 502 the step of transforming the user's natural language question into an intermediate representation is shown. The intent and entities from the users input query (question) are extracted with a natural language processor. In the illustrative example the user's question of "Does great value milk contain Vitamin D3", the intent is product_info_nutrient and the entities include product, milk, nutrient=Vitamin D3 and brand-great value. Based on the extracted intent and entities, the customer's natural language question may be translated/transformed in to an intermediate representation. The entities may include specific products, types of products, categories of products, and attributes of products. The syntax for the intermediate representation may include the predicate names and arity "PREDICATE/ARITY", for example CONTAINS/2, is/2, VALUEOF/4, VALUEOFPROP/3, PROD/n where n is the number of attributes associated with a product in the graphical knowledge base.

In the current example:
IF intent==product_info_nutrient:
  IF product(P) and related entities such as brand(B) in entities.
    THEN X=prod(P, brand=B);
  IF nutrient(N) in entities:
    THEN Y=N;
and the Intermediate (Predicate) representation becomes "CONTAINS(prod(P, brand=B),N)" and/or "CONTAINS (prod(milk, brand=great value),vitamin D3)."

This intermediate representation does not invoke a database query language and thus is independent of the database(s) upon which the knowledge base is housed. This advantageous benefit of having a database independent representation enables the system to generate a query corresponding to any database, for example, graphical DB called Neo4j, SQL or MongoDB.

Other examples of this transformation into the intermediate representation that may aid in the understanding are "What brands of milk do you have?" or "How much fat does a serving of great value milk contain?" which result in a transformation into intermediate representations of "VALUEOFPROP(X, in, Y) where X=brand and Y={value: milk, type: product}" and "VALUEOFPROP(X, in, Y) where X=fat and Y={value: milk, type: product, brand: great value}" respectively.

The next step as shown in Block 503 is the creation of a cypher query from the intermediate representation. The cypher query is based upon the intermediate representation but is database query language specific (i.e. database dependent). Advantageously, since only the generation of the cypher query is dependent, use of the described method with different databases only requires tailoring the cypher generation to the specific database/language used, and does not require reconfiguration of the intermediate representation generation process.

In the illustrative example the intermediate representation "contains(prod(P, brand=B),N)" and/or "contains(prod (milk, brand=great value),vitamin D3)" is used to create the database specific cypher query. For example it can be used to create a SQL query such as "SELECT Vitamin D3 from KB WHERE root_node is milk AND Y has_brand great value, or a neo4j query, on a graph of the type shown in FIG. 3, such as MATCH (x:root {value: milk})-[:has_instance]->(y:product)-[:contains]->(z:attribute {value: Vitamin D3}). Also, a mongoDB query such as {"root": "milk", "has_instance": {"contains": "Vitamin D3"} } for a SQL knowledge base "SELECT Vitamin D3 from KB WHERE root_node is milk AND Y has_brand great value."

The database is then queried with the cypher query as shown in Block 504 and, the result (i.e. retrieved information) is received from the database 116 in response to the query as shown in Block 505. This information may be tailored for presentation and provided to the user over the communication system as an answer to the user's question as shown in Block 506.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system for retrieving information from a knowledge base in response to a user's natural language question comprising:
    a communication system;
    a database containing the knowledge base; and
    a computing device operably connected to the database and the communication system, the computing device configured to:
        receive the user's natural language question from the communication system,
        transform the user's natural language question into an intermediate representation,
    wherein the intermediate representation is a predicate selected from a set of predicates,
    wherein each of the set of predicates is associated with a number of input arguments and
    is determined based on a manner the database is queried,
        generating a cypher query from the intermediate representation,
        query the database with the cypher query,
        receive information from the database in response to the query, and
        provide the information to the user over the communication system.

2. The system of claim 1, wherein the intermediate representation is independent of the database.

3. The system of claim 1, wherein the computing device further comprises a natural language processor and is further configured to extract the intent and entities from the user's natural language question in order to transform the user's natural language question into the intermediate representation.

4. The system of claim 3, wherein the computing device is further configured to transform the user's natural language question based on the extracted intent and the entities.

5. The system of claim 1, wherein the cypher query is database dependent.

6. The system of claim 4, wherein the entities are selected from group consisting of specific products, types of products, categories of products, and attributes of products.

7. The system of claim 1, wherein the database is selected from the group consisting of a SQL database, a Mongo database and a Neo4j database.

8. The system of claim 7, wherein the database includes a first database and second database, the second database being a different type of database than the first database.

9. The system of claim 1, wherein:
- the computing device comprises an online shopping assistant;
- the set of predicates includes: CONTAINS, IS, VALUEOF, VALUEOFPROP, PROD;
- the number of input arguments is: 2, 3, 4 or n; and
- n represents a number of attributes associated with a product in the database.

10. A method of retrieving information from a knowledge base in response to a user's natural language question comprising:
- receiving the user's natural language question over a communication system;
- transforming the user's natural language question into an intermediate representation, wherein the intermediate representation is a predicate selected from a set of predicates, wherein each of the set of predicates is associated with a number of input arguments and is determined based on a manner a database is queried;
- generating a cypher query from the intermediate representation;
- querying the database with the cypher query;
- receiving information from the database in response to the query; and
- providing the information to the user over the communication system.

11. The method of claim 10, wherein the intermediate representation is independent of the database.

12. The method of claim 10, wherein the step of transforming the user's natural language question into the intermediate representation includes the step of extracting the intent and entities from the user's natural language question via a natural language processor.

13. The method of claim 12, wherein the step of transforming the user's natural language question is based on the extracted intent and the extracted entities.

14. The method of claim 10, wherein the cypher query is database dependent.

15. The method of claim 13, wherein the entities are selected from group consisting of specific products, types of products, categories of products, and attributes of products.

16. The method of claim 10, wherein the database is one of the group consisting of a SQL database, a Mongo database and a Neo4j database.

17. The method of claim 16, wherein the database includes a first database and second database, the second database being a different type of database than the first database.

18. The method of claim 10, wherein the step of extracting the intent and entities is performed by a natural language processor.

19. A non-transitory computer readable medium having instructions stored thereon, wherein the instructions, when executed by at least one processor, cause a device to perform operations comprising:
- receiving a user's natural language question over a communication system;
- transforming the user's natural language question into an intermediate representation, wherein the intermediate representation is a predicate selected from a set of predicates, wherein each of the set of predicates is associated with a number of input arguments and is determined based on a manner a database is queried;
- generating a cypher query from the intermediate representation;
- querying the database with the cypher query;
- receiving information from the database in response to the query; and
- providing the information to the user over the communication system.

20. The non-transitory computer readable medium of claim 19, wherein the intermediate representation is independent of the database and the cypher query is dependent upon the database.

* * * * *